(12) United States Patent
Mitchell et al.

(10) Patent No.: US 11,719,341 B2
(45) Date of Patent: Aug. 8, 2023

(54) VESSEL CLOSURE DEVICE WITH FAIL SAFE FAILURE DETECTION MEANS

(71) Applicant: TDW Delaware, Inc., Wilmington, DE (US)

(72) Inventors: Joshua D. Mitchell, Broken Arrow, OK (US); William C. Keenan, Broken Arrow, OK (US); William J. Tefft, Claremore, OK (US); Joseph Alan Morton, Tulsa, OK (US); Aaron M. Ritchie, Tulsa, OK (US); Robert Fulton Hendricks, Tulsa, OK (US); Samuel R. Boehning, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 938 days.

(21) Appl. No.: 16/432,144

(22) Filed: Jun. 5, 2019

(65) Prior Publication Data

US 2019/0366289 A1 Dec. 5, 2019

Related U.S. Application Data

(60) Provisional application No. 62/680,801, filed on Jun. 5, 2018.

(51) Int. Cl.
*F16J 13/24* (2006.01)
*F16L 55/115* (2006.01)
*F16J 13/06* (2006.01)

(52) U.S. Cl.
CPC ............. *F16J 13/24* (2013.01); *F16J 13/065* (2013.01); *F16L 55/115* (2013.01)

(58) Field of Classification Search
USPC .............................. 220/203.22, 316, DIG. 20
See application file for complete search history.

(56) References Cited

U.S. PATENT DOCUMENTS

| | | | | |
|---|---|---|---|---|
| 3,990,605 | A * | 11/1976 | Hanke | ...................... F16J 13/24 |
| | | | | 292/256.73 |
| 4,237,936 | A | 12/1980 | Lollis et al. | |

(Continued)

FOREIGN PATENT DOCUMENTS

WO 8401354 A1 4/1984

*Primary Examiner* — Robert K Arundale
*Assistant Examiner* — Richard K. Durden
(74) *Attorney, Agent, or Firm* — GableGotwals (57) ABSTRACT

A closure [10] for a cylindrical vessel includes at least one holding means [30] configured to move the closure into a fully closed state, the holding means having a predetermined actuation force or torque to properly close the closure, the closure including one or both of the following failsafe failure detection features: a mechanical fuse [20] having a predetermined load failure force below that of a load failure force of at least one component of the holding means and above that of a predetermined actuation force or torque to properly close the closure; or a block [40] sized to at least partially overlap a pressure warning lock hole [19] of the closure door when the closure is not in the fully closed state and to fully expose the pressure warning lock hole when the closure is in the fully closed state, thereby permitting insertion of a pressure warning lock [17].

8 Claims, 8 Drawing Sheets

(56) References Cited

U.S. PATENT DOCUMENTS

| | | | |
|---|---|---|---|
| 4,515,287 A | | 5/1985 | Baudoux et al. |
| 4,932,550 A | * | 6/1990 | Moucha ................ A47J 27/092 |
| | | | 99/403 |
| 6,007,120 A | * | 12/1999 | Vogt ..................... B65D 45/345 |
| | | | 292/256.65 |
| 6,105,808 A | * | 8/2000 | Mendonca .............. A47J 27/09 |
| | | | 220/756 |
| 6,648,009 B1 | * | 11/2003 | Craig ...................... F16K 35/06 |
| | | | 73/201 |
| 2005/0244226 A1 | | 11/2005 | Lacroix |
| 2007/0194033 A1 | * | 8/2007 | Dos Santos Junior ..................... |
| | | | F16L 55/1157 |
| | | | 220/912 |
| 2018/0010724 A1 | | 1/2018 | Kozak |

* cited by examiner

VESSEL CLOSURE DEVICE WITH FAIL SAFE FAILURE DETECTION MEANS

CROSS-REFERENCE TO CO-PENDING APPLICATIONS

This application claims priority to U.S. 62/680,801 filed Jun. 5, 2018, the content of which is incorporated by reference herein.

BACKGROUND

This disclosure is in the field of pipeline and vessel closures like those used, for example, to provide access to a pig trap during launch and recovery operations.

By way of example, a pig trap includes a collar adapted to be attached to an end of a pipe, a door for opening and closing the end of the pipe, means for holding the door to the collar, and means for sealing the door to the collar when the door is held to the collar. The holding means may include segmented plates that expand inside the collar barrel or clamps that hold the door against the barrel. U.S. Pat. No. 4,237,936 to Lollis et al. provides an example of a closure that makes use of clamps.

SUMMARY

Embodiments of a closure for a cylindrical vessel includes at least one holding means configured to move the closure into a fully closed state, the holding means having a predetermined actuation force or torque to properly close the closure, the closure including one or both of the following failsafe failure detection features:
- a mechanical fuse having a predetermined load failure force below that of a load failure force of at least one component of the holding means and above that of the predetermined actuation force or torque; or
- a block sized to at least partially overlap a pressure warning lock hole of the closure door when the closure is not in the fully closed state and to fully expose the pressure warning lock hole when the closure is in the fully closed state.

The holding means move between an unactuated or open position and an actuated or fully closed position. In embodiments, the holding means may include a pair of clamp rings arranged about a door of the closure so as to hold the door in a closed and sealed condition. The predetermined actuation force is above the weight of the clamp rings.

BRIEF DESCRIPTION OF THE DRAWINGS

FIG. 7 is an enlarged view of the block of FIG. 6.

DETAILED DESCRIPTION

Embodiments of a closure include a mechanical fuse, a pressure warning lock block, or a combination of the mechanical fuse and the pressure warning lock block. The embodiments may be adapted to a closure the same or similar to that as disclosed in U.S. Pat. No. 4,237,936 to Lollis et al. or U.S. Pat. No. 4,515,287 to Baudoux et al., the contents of which are incorporated by reference herein.

Figure 1:
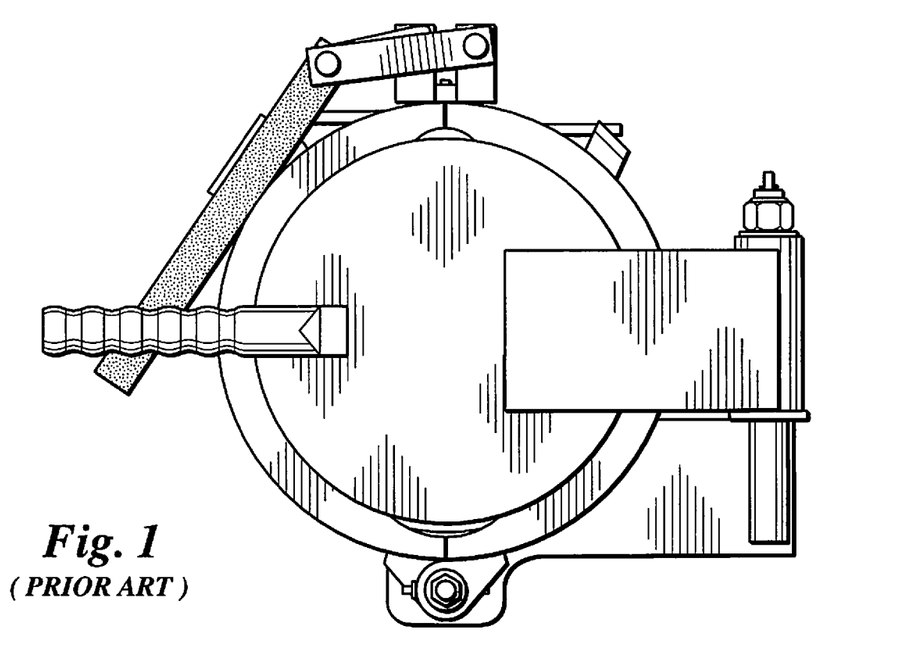
FIG. 1 is an isometric view of a prior art closure with holding means properly closing the closure in a fully closed state. The holding means include a handle with a linkage connected to clamp rings.
Figure 2:
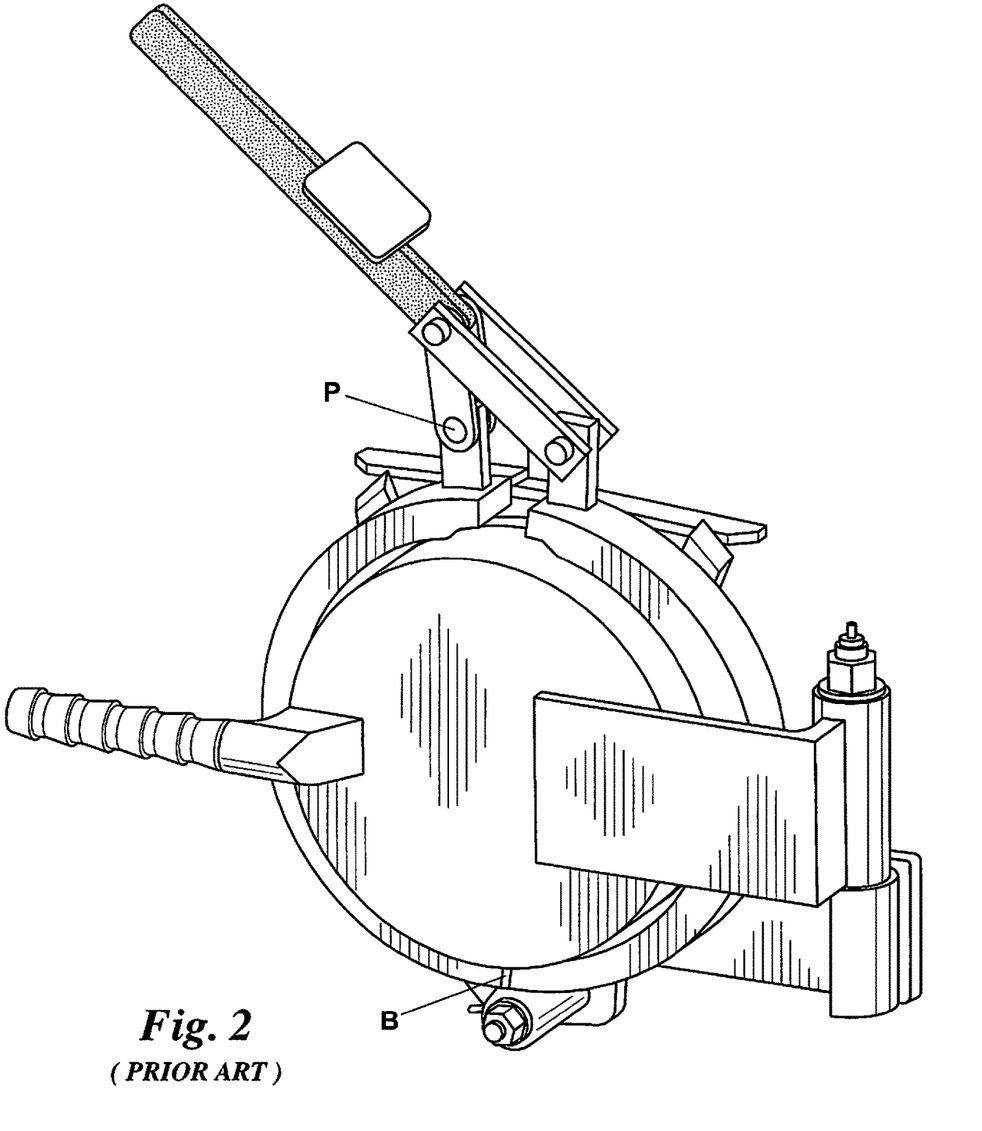
FIG. 2 is the prior art closure of FIG. 1, illustrating blockage or debris in a bottom portion of the closure prior to actuation of the holding means. None of the pins "P" that hold the closure together are designed as a weak link.
Figure 3:
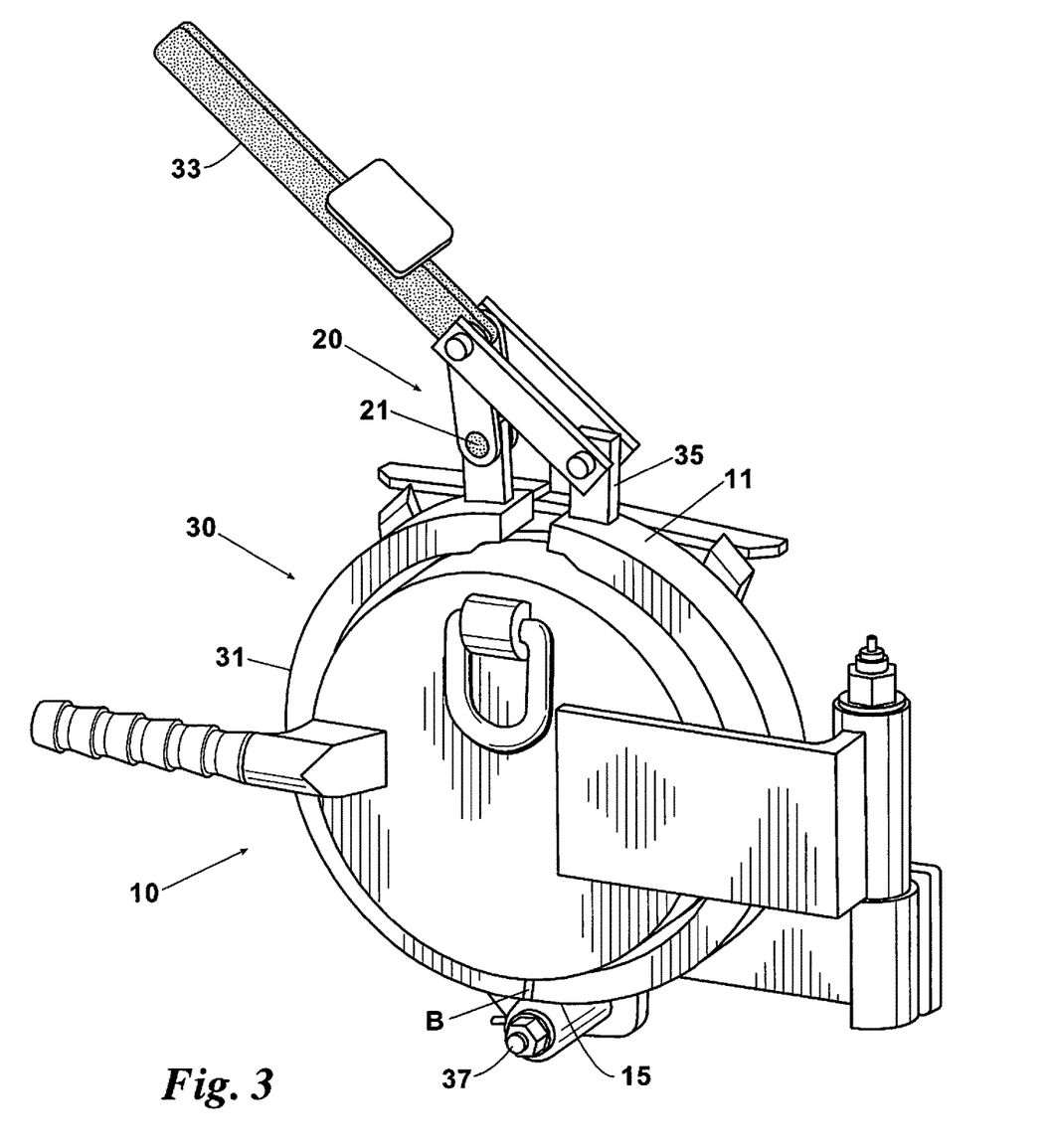
FIG. 3 is an isometric view of an embodiment of a closure of this disclosure including a mechanical fuse capable of preventing a failure of at least one other component of the closure when there is blockage or debris or where excessive force is required to properly close the closure.
Figure 4:
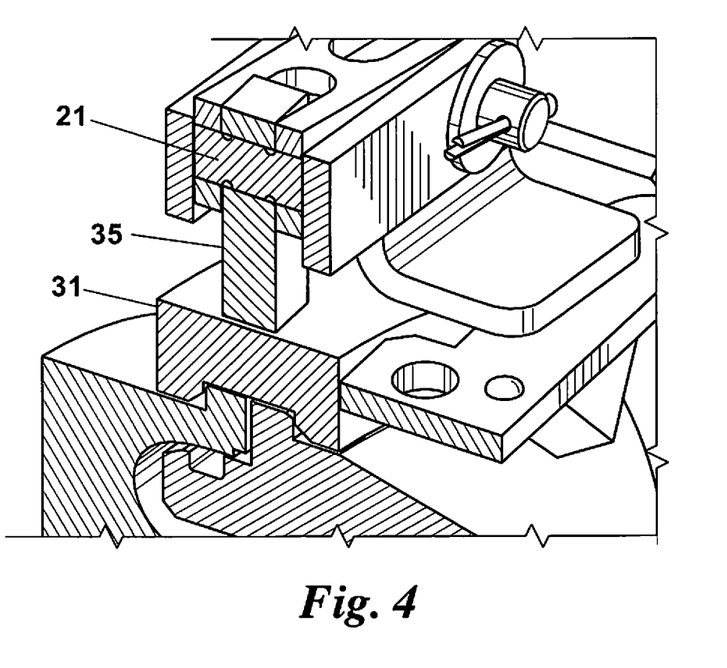
FIG. 4 is an enlarged cross section view of the mechanical fuse of FIG. 3.
Figure 5:
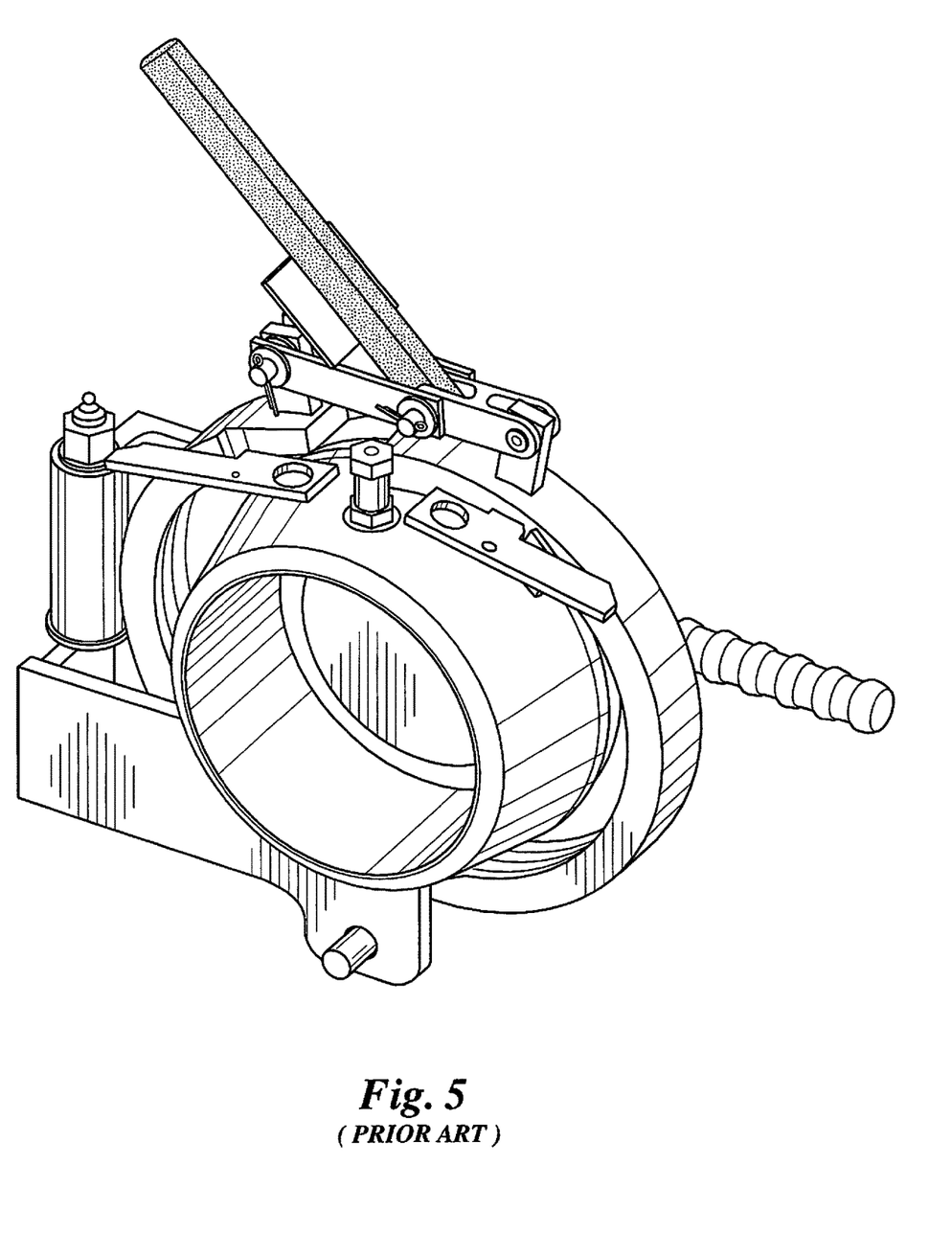
FIG. 5 is a rear isometric view of a prior art closure and illustrating a pressure warning lock. It may be possible to install the pressure warning lock without the holding means being properly closed.

Referring first to FIGS. 3 & 4, in embodiments of this disclosure a closure 10 includes at least one mechanical fuse 20 having a predetermined load failure force below that of a load failure force of at least one component of holding means 30 of the closure and above that of a force to provide a predetermined actuation force or torque to overcome the holding means 30. In some embodiments the mechanical fuse 20 includes a shear pin 21 or its equivalent. The holding means 30 may include one or more clamp rings 31. A handle 33 may be connected to the clamp rings 31 by corresponding lugs 35, at least one of which includes the mechanical fuse 20.

The load failure force of the mechanical fuse 20 is above the predetermined actuation force of the holding means 30 to properly close the closure 10 into a fully closed position but below that of load failure force of another component of the holding means 30. In embodiments, the other component may be a welded component such as, but not limited to, the lugs 35. The predetermined actuation force may be a force to overcome the weight of the holding means 30. The holding means 30 may include a pair of clamp rings 31, the predetermined actuation force being above a weight of the pair of clamp rings 31. The closure 10 is in the fully open state when the closure door can be opened without making contact with the pair of clamp rings 31. In embodiments, the fully open state can occur when a portion 40a of the block 40 comes into contact with a clamp ring stop 31a. The closure 10 is in the fully closed state when the block 40 does not interfere with the pressure warning lock hole 19 and there is a clear path for the pressure warning lock to thread into the pressure warning lock hole 19.

In embodiments, the mechanical fuse 20 may be located on a top end or portion 11 of the closure 10 so as to be visible to an operator. In some embodiments, the mechanical fuse 10 may be located on the top end 11 of the closure 10 in proximity to a pressure warning lock 17. Where the holding means 30 include clamp rings 31, a common pivot point 37 (e.g. a pin or its equivalent) of the clamp rings 31 may be located toward a bottom end or portion 15 of the closure. When blockage or debris "B" in a bottom portion 15 of the closure 10 causes an increase in force to be applied to actuate the holding means 30 during closure (but still below the failure force of another component such as the common pivot point 37), the mechanical fuse 20 fails. The failed mechanical fuse 20 may be easily detectable and visible to an operator. The planned failure of the fuse 20 protects at least one other component of the closure from failing due to excessive force required to close the holding means 30.

Figure 6:
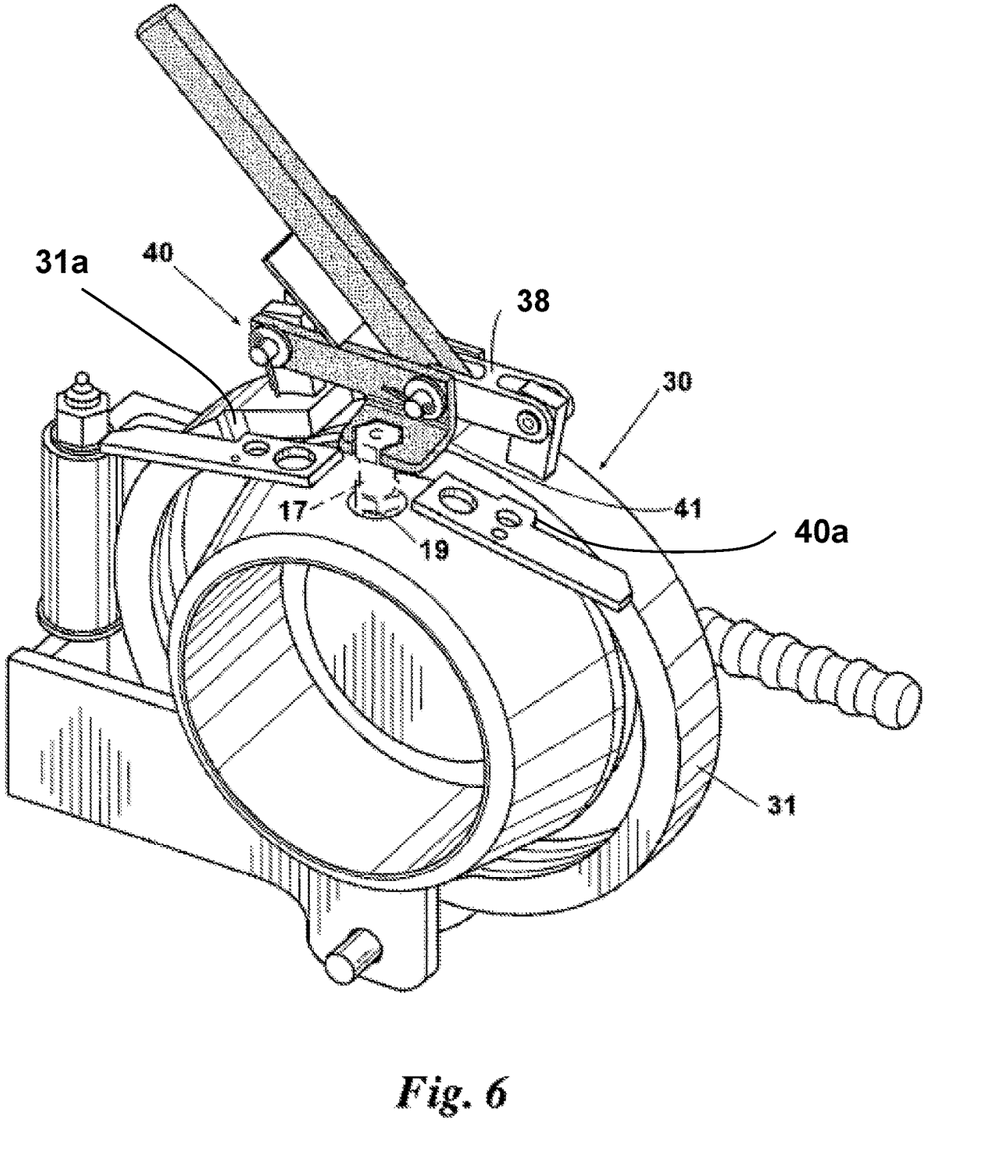
FIG. 6 is a rear isometric view of an embodiment of a closure of this disclosure, shown in a fully open state, including a block that prevents the pressure warning lock from being inserted when the closure is not in a fully closed state. The block may be a bracket sized to at least partially cover the pressure warning lock hole when the holding means have not been fully actuated to properly close the closure. The block is illustrated to show the interference with the pressure warning lock, which cannot be inserted into the pressure warning lock hole, until the closure is fully closed and the block clears the pressure warning lock hole.
Figure 7:
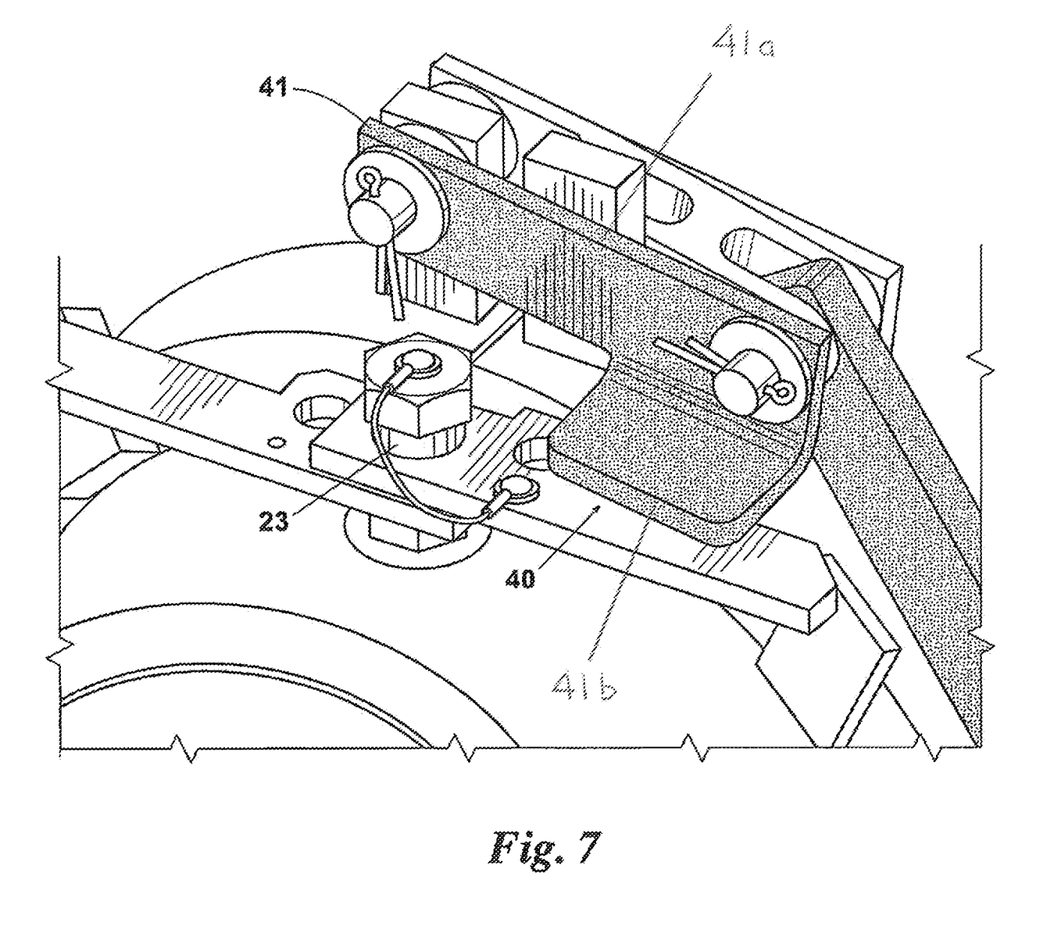
FIG. 7 is an enlarged view of the block of FIG. 6, the closure being shown in a fully closed state.

Referring now to FIGS. 6 & 7, in embodiments of a closure 10 of this disclosure, a block 40 interferes with a pressure warning lock 17, thereby preventing insertion or installation of the lock 17 into the pressure warning lock hole 19 when the closure 10 is opened or not in a fully closed state. The block 40 is a bracket 41 connected to the pair of clamp rings 31 by way of linkage 38 (which, in turn, is connected to the lugs 35 of the clamp rings 31). The bracket 41 includes an upper arm 41a that runs parallel to the linkage 38 and a lower arm or flange 41b that runs perpendicular to it. The upper arm 41a is longer than the lower arm 41b in a longitudinal direction, the lower arm 41b being longer than the upper arm 41a in a lateral direction. The block 40 may be sized so that when the closure 10 is in the fully closed state, the pressure warning lock 17 may be installed in the hole 19. The pressure warning lock 17 may include a pin 23. The holding means 30 may be actuated by a handle 33 or by a ratchet-style closing mechanism 51 of a kind known in the art. See e.g. FIGS. 8 & 9.

Figure 8:
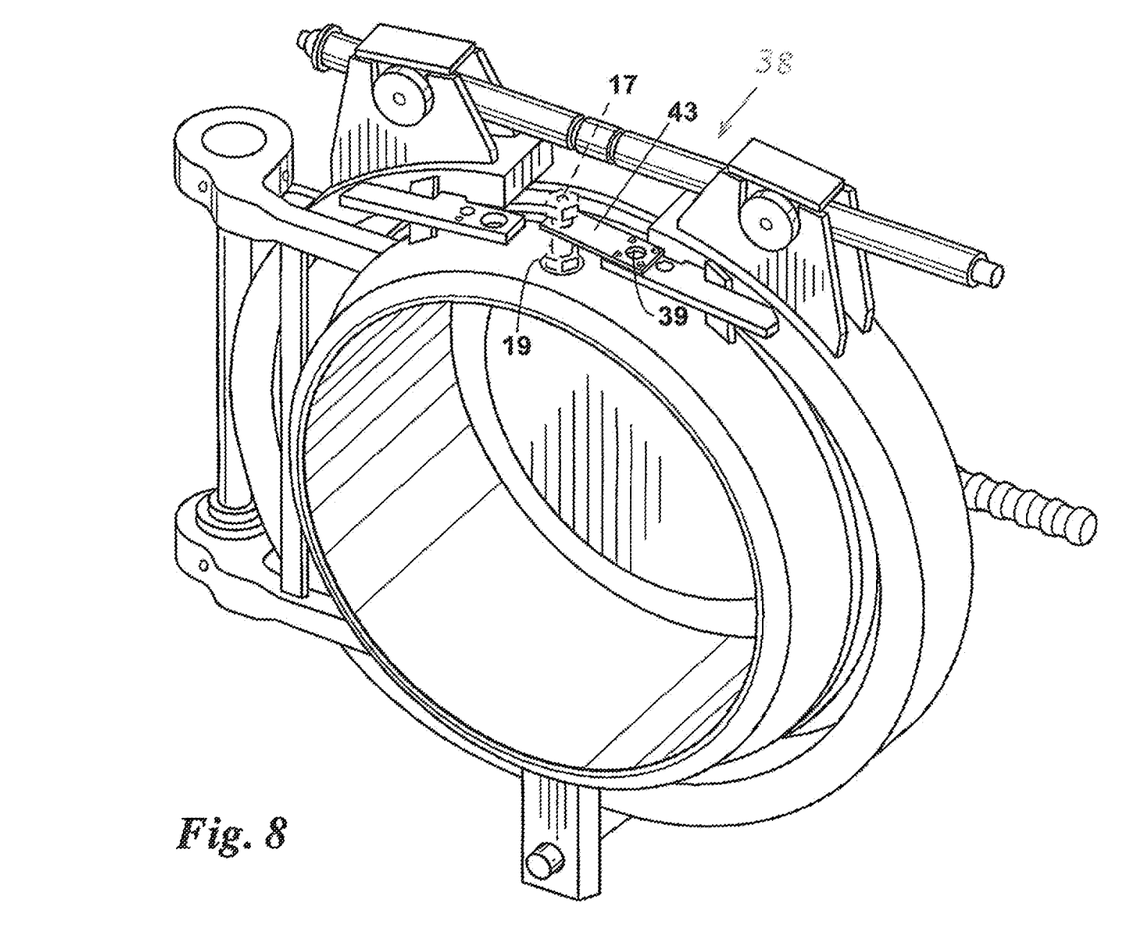
FIG. 8 is a rear isometric view of an embodiment of a closure of this disclosure including a ratchet-style closing mechanism and a block. The block may include an extended plate that at least partially covers the pressure warning lock hole when the closure is not yet properly closed. The plate is illustrated to show the interference with the pressure warning lock.
Figure 9:
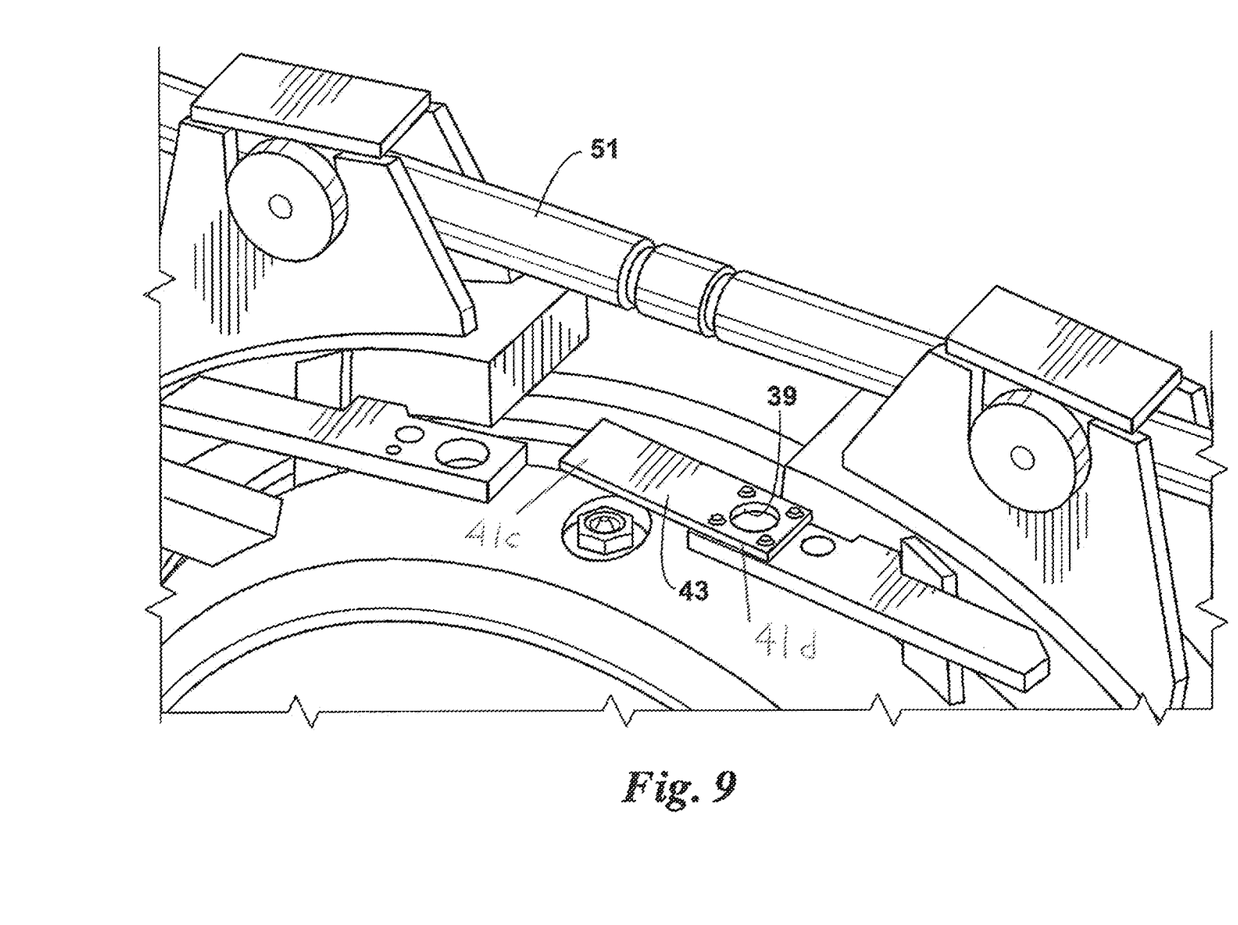
FIG. 9 is an enlarged view of the block of FIG. 8.

Referring now to FIGS. 8 & 9, in some embodiments the block 40 includes a bracket 41 connected to a linkage 38 of the holding means 30. In other embodiments, the bracket 41 may be at least one plate 43 that aligns the pressure warning lock 17 with the hole 19. The bracket 41 may include alignment means 39 at one end 41c for the pressure warning lock 17 and sized to overlap the pressure warning lock hole 19 at another end 41d. Unlike prior art closures, the plate 43 is extended in length so that when the holding means 30 are opened or not fully closed, the plate 43 at least partially covers the pressure warning lock hole 19 and prevents the pressure warning lock 17 from being inserted into the hole 19. When the holding means 30 are fully actuated and the closure 10 is properly closed, the hole 19 is fully exposed. In some embodiments, holding means 30 includes one or more clamp rings 31.

While embodiments of the closure have been described, the closure may be modified without departing from the scope of the following claims. The claims are entitled to the full range of equivalents to which recited element is entitled.

The invention claimed is:

1. A closure [10] for a cylindrical vessel, the closure comprising:
    a pair of clamp rings [31] having a predetermined actuation force above the weight of the pair of clamp rings;
    a pressure warning lock hole [19]; and
    a block [40] connected to the pair of clamp rings and sized to at least partially overlap the pressure warning lock hole when the pair of clamp rings is in a fully open state and to fully expose the pressure warning lock hole when the pair of clamp rings is in a fully closed state.

2. A closure according to claim 1, the pair of clamp rings including a linkage [38] connecting the pair of clamp rings, the block connected to the linkage and including a bracket [41] having an upper arm [41a] running parallel to the linkage and a lower arm running perpendicular to the linkage [41b].

3. A closure according to claim 2, further comprising:
    at least one mechanical fuse [20] including a shear pin [21] connecting a lug of the pair of clamp rings to the linkage; the shear pin [21] having a predetermined load failure force below that of a load failure force of another component of the closure and above that of the predetermined actuation force of the pair of clamp rings, the another component of the closure selected from the group consisting of the lug [35] connected to the linkage by the shear pin and a pivot point [37] of the pair of clamp rings.

4. A closure according to claim 2, further comprising a handle [33] connected to the linkage of the pair of clamp rings.

5. A closure according to claim 1, the pair of clamp rings including a linkage [38] connecting the pair of clamp rings, the block moving with the linkage and including a bracket [41] in a form of a plate [43] having one end [41c] that overlaps the pressure warning lock hole when the pair of clamp rings is in the fully open state and another end [41d] containing alignment means [39] for a pressure warning lock, the alignment means for the pressure warning lock fully exposing the pressure warning lock hole when the pair of clamp rings is in the fully closed state.

6. A closure according to claim 5, wherein the linkage includes a ratchet mechanism [51] connecting the pair of clamp rings.

7. A closure according to claim 1, further comprising:
    at least one mechanical fuse [20] connected to a lug of the pair of clamp rings; the at least one mechanical fuse having a predetermined load failure force below that of a load failure force of another component of the closure and above that of the predetermined actuation force, the another component of the closure selected from the group consisting of the lug [35] connected to the at least one mechanical fuse and a pivot point [37] of the pair of clamp rings.

8. A closure according to claim 7, the at least one mechanical fuse being a shear pin [21].

* * * * *